United States Patent [19]
Wolters et al.

[11] Patent Number: 4,513,538
[45] Date of Patent: Apr. 30, 1985

[54] METHOD OF AND APPARATUS FOR THE SUPERFINISHING OF A THIN-WALL METAL WORKPIECE

[75] Inventors: Martin Wolters; Gerd R. Meuer, both of Wuppertal, Fed. Rep. of Germany

[73] Assignee: Maschinenfabrik Ernst Thielenhaus GmbH, Wuppertal, Fed. Rep. of Germany

[21] Appl. No.: 483,249

[22] Filed: Apr. 8, 1983

[30] Foreign Application Priority Data

Feb. 23, 1983 [DE] Fed. Rep. of Germany ....... 3306246

[51] Int. Cl.³ .............................................. B24B 5/00
[52] U.S. Cl. ..................................... 51/131.3; 51/132; 51/165.73; 51/266; 51/322
[58] Field of Search ................. 51/131.3, 132, 165.73, 51/266, 322

[56] References Cited

U.S. PATENT DOCUMENTS

| 822,096 | 5/1906 | Bagnall | 51/131.3 |
| 1,607,292 | 11/1926 | Miller | 51/266 |
| 2,214,373 | 9/1940 | Herchenrider | 51/266 |
| 3,611,654 | 10/1971 | Weber et al. | 51/266 |
| 3,992,820 | 11/1976 | Suter | 51/266 |

FOREIGN PATENT DOCUMENTS

| 450928 | 8/1948 | Canada | 51/266 |
| 835727 | 6/1981 | U.S.S.R. | 51/266 |

Primary Examiner—Frederick R. Schmidt
Assistant Examiner—J. T. Zatarga
Attorney, Agent, or Firm—Karl F. Ross; Herbert Dubno

[57] ABSTRACT

A honing, superfinishing or superfinished grinding system utilizes a tool rotatable about an axis for superfinishing a surface of a thin wall workpiece whose other surface is directly contacted by a coolant to remove heat directly opposite the machining surface and thereby prevent distortion.

7 Claims, 4 Drawing Figures

METHOD OF AND APPARATUS FOR THE SUPERFINISHING OF A THIN-WALL METAL WORKPIECE

FIELD OF THE INVENTION

Our present invention relates to a method of and to an apparatus for the superfinishing or super-finish grinding or honing of a surface of a thin-wall metal workpiece and, more particularly, to the super finish grinding or honing of such a workpiece whereby both the workpiece and the honing or superfinishing tool are rotated.

BACKGROUND OF THE INVENTION

For the purpose of this description, the term "honing" and the term "superfinishing" or "super-finish grinding" may be used interchangeably to indicate a fine grinding or finishing operation in which a surface of a workpiece is abraded to leave the high quality, usually bright metal surface practically free from surface irregularities. While technically superfinishing and honing may not be exactly equivalent because various movements of the workpiece and tool can be involved in honing while others may be involved in super-finish grinding, for the purposes of the present invention, the honing, superfinishing and super-finish grinding processes will be considered to be equivalent, to preferably use a cup-shaped tool whose rim is active to abrade a surface of the workpiece and which is set in rotation while the workpiece is rotated or other means is provided for generating relative displacement of the tool and workpiece.

Generally in such treatments of a workpiece surface to finish this surface, a coolant is supplied to the interface between the workpiece and the tool to carry away any machining detritus and to cool the workpiece surface which might otherwise deform because of the intensity of heating resulting from the rubbing action of the tool against the workpiece.

The tool may be a so-called diamond wheel.

In practice, the coolant is a grinding oil or a grinding emulsion and is applied in a fine stream or jet with relatively low pressure directly to the machining region, i.e. the jet is trained upon the region at which the tool contacts the workpiece surface.

It has been found that this does not prevent distortion of the workpiece as a result of uncontrolled heating of the latter since, especially when the workpiece has a thin wall, heat conductivity between the area in direct contact with the tool and the adjacent surfaces of the workpiece bathed in the cooling liquid, is comparatively poor. As a result, local overheating can occur. Local overheating can result in distortion of the workpiece and excessive machining and material removal at certain locations.

Experience has shown that in spite of the use of large quantities of cooling liquid in these earlier cases, temperatures up to 800° C. can be detected in the region in which the tool abrades the workpiece. Since the tool covers the workpiece in these regions, it can frequently prevent access of the coolant thereto and hence it is preferred to use a narrow surface of the tool so as to minimize the area over which excessive heating may occur.

This is not a complete answer to the problem since nevertheless excess of heating may occur in the contact region and the smaller area of contact may create other problems with respect to uniformity in precision and flatness of the machining operation.

The problem is especially pronounced for so-called composite workpieces where elements thereof may have different thermal coefficients of expansion and contraction. The same applies for workpieces which because of their configuration, e.g. because of a reduction in cross section, are incapable of providing an adequate heat conductivity away from the machining site.

With all of these workpieces, even in relatively short machining times of 5 to 10 seconds, thermal deformation can and frequently does occur under conventional conditions and the thermal deformation may remain upon cooling. In practice it turns out to be difficult, if not impossible, to hold the planarity, sphericity or like tolerances to 1–3 microns as is frequently necessary.

OBJECTS OF THE INVENTION

It is, therefore, the principal object of our present invention to provide a method of and apparatus for the honing, superfinishing or super-finish grinding of a metallic workpiece whereby the aforedescribed disadvantages are obviated.

Another object of this invention is to provide an improved method of finishing a workpiece by a grinding operation, preferably utilizing a cup-shaped tool, whereby the cooling of the workpiece is improved so that thermal deformation resulting from overheating during machining is minimized.

Another object of this invention is to provide an improved apparatus for the superfinishing or grinding of a workpiece so that the irregularities, deviations from planarity or sphericity, and like disadvantages, discussed above, do not arise.

SUMMARY OF THE INVENTION

These objects and others which will become apparent hereinafter are attained, in accordance with the present invention, in a method of superfinishing, a super-finish grinding, or honing a metallic workpiece which comprises the steps of juxtaposing the workpiece with a rotating honing tool so that the surface of the workpiece to be ground is in contact with the tool, disposing the workpiece in a holder so as to position it with respect to the tool, disposing at least a portion of a surface of the workpiece opposite the machined surface and directly opposite the tool so that it lies out of contact with the holder and directing a flow of a liquid coolant against this latter portion of the surface whereby the free counter surfaces thus provided is contacted with and in direct heat exchanging relationship with the cooling liquid.

The invention is based upon our discovery that the honing action can be effected in a manner such that the heat generated by the honing action is transmitted through the thin wall of a workpiece directly to the counter surface aligned with the machining area of the tool and is then conducted immediately away by heat exchange with the liquid which is directed against this latter counter surface so that the heating affects cannot distort the workpiece, the heat does not have to be conducted laterally of the machining zone into regions not in contact with the tool, and the heat transfer from the machining face to the liquid is especially rapid.

Investigation has shown that the technique is especially effective for metal workpiece with wall thicknesses up to 10 millimeters and from thicknesses of several millimeters. The temperature of the coolant should be held substantially constant by a cooling unit, e.g. a refrigerating unit, and the volume rate of flow of the coolant should be so selected that practically all of the heat generated in the machining process is carried off reliably by the coolant.

Actual values of the rate of flow, temperature and like rheological properties will of course depend upon the nature of the material of the workpiece and the conditions of the honing or grinding operation.

Surprisingly, with proper selection of the conditions, the machine workpiece will be practically free from any imprecision or variations in the surface character which might otherwise have been attributed to thermal action.

According to a feature of the invention, the coolant flow is trained upon the back of the workpiece in such manner that it does not adversely affect the positioning of the workpiece in the holder. For instance, the holder can be provided with a surface juxtaposed with the back of the workpiece and hence the counter surface thereof, the workpiece being centered with respect to this surface by fingers or the like which reach around the edge of the holder and can engage the lateral edges of the workpiece. In this case, the coolant is introduced in a coolant stream substantially perpendicular to the counter surface through an orifice in the holder surface and into the region between the counter surface and the holder surface. The flow of liquid is thereby deflected radially by the workpiece surface. It has been found to be advantageous, in this embodiment, to provide the holder surface with radially outwardly extending channels open toward the counter surface.

The coolant is preferably directed towards the counter surface from a diffuser, i.e. a liquid passage of progressively widening or increasing cross section, this diffuser having an access perpendicular to the counter surface. The diffuser assists in the radial deflection of the coolant along the back of the workpiece.

The invention thus uses known hydrodynamic and herodynamic effects to position the workpiece on a fluid cushion against the honing or grinding pressure while insuring an especially intensive heat dissipation and cooling.

When one operates in the manner described and provides a workpiece whose configuration is symmetric to the axis of rotation of the holder, which can also be rotated, the cooling conditions are found to be especially reproducible and the distortion minimal.

The coolant can be a grinding oil, a grinding emulsion or even just water and, in some cases, even a gaseous cooling fluid can be used, preferably air.

The apparatus of the present invention, of course, comprises the elements previously described are arranged so as to carry out the method of the invention.

The workpiece holder, for example, may have a central space which is covered by the thin wall of the workpiece to be ground or machined. A coolant feeder is provided which opens into this space, lies along the axis of rotation of the holder and preferably along the axis of symmetry of the workpiece and is formed at its discharge end with the aformentioned diffuser training the liquid stream unto the workpiece and from which the liquid stream is deflected generally radially to pass between the centering fingers which can engage lateral edges of the workpiece.

When the workpiece is cup-shaped or has the configuration of a hemisphere, i.e. is hollow, a preferred embodiment of the invention provides that the holder is a substantially cylindrical array of such fingers or is a cylindrical holder provided with radial slots through which the cooling liquid can escape. Since the workpiece is rotated in the holder, the centrifugal force thereby applied to the coolant promotes the radial deflection of the coolant when it emerges from the diffuser. The cup-shaped workpiece can be open downwardly to allow escape of the coolant freely.

When the workpiece has a disk configuration, the holder can have a surface provided in the manner described within a fixed array of fingers while the surface of the holder can have the radially extending channels previously described.

In both cases, the coolant can be collected in a receiving trough, tray, or basin and, after cooling by a refrigerating unit, can be recirculated.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
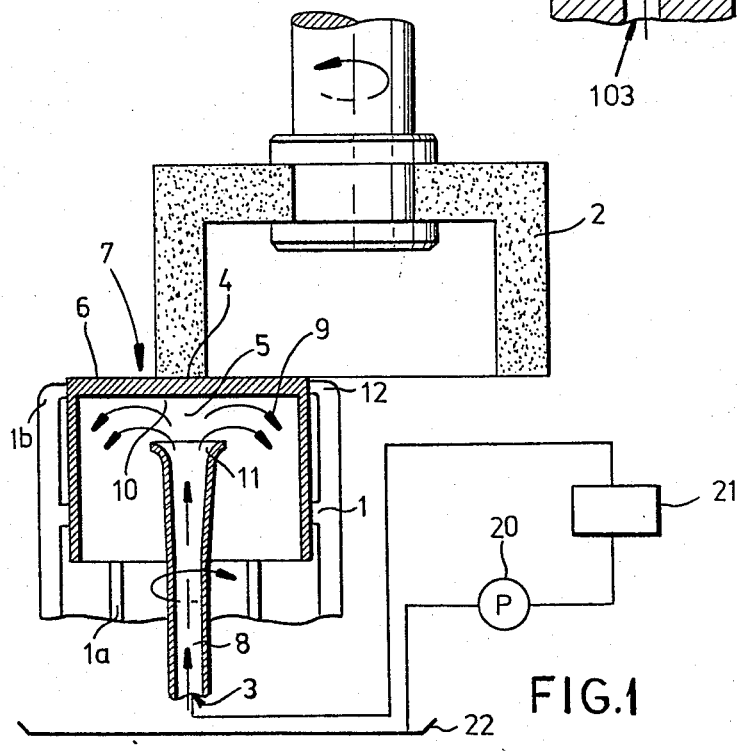
FIG. 1 is an axial cross sectional view through a device for the honing of a surface of a cup-shaped hollow workpiece.

In FIG. 1, we have shown a workpiece holder 1 in the form of a cylindrical body formed with slits 1a and in the nature of a collet which can be connected to the rotating pipe 3 through which the liquid can be directed onto the back of a workpiece.

This workpiece holder cooperates with a rotating hone or super-finish grinding tool 2 which is rotated about its axis as represented by the arrow.

The coolant line 3 can be connected to a refrigerating unit 21 through which the coolant is displaced by a pump 20 from a collecting tray 22 which receives the liquid cascading from the workpiece.

The coolant is thus directed onto the reverse side of a thin-wall workpiece whose surface 4 directly opposite the coolant-contacted side is in direct contact with the tool 2.

The holder 1 thus comprises a central space 5 which is covered by the wall 6 of the workpiece 7 to be machined and which thus closes the latter upwardly.

The coolant passage 8 of the tube 3 opens within the space 5 via a diffuser 11 which assists in spreading the liquid radially outwardly as is also indicated by the arrows.

The embodiment of FIG. 1 is especially effective for cup-shaped workpieces 7 and, although a cylindrical workpiece 7 has been illustrated, the principles thereof are applicable to hemispherical workpieces as well, in which case the tool 2 will be hemispherically contoured.

The holder 1 can be clamped by the members 1b of the holder so that the fingers 12 engage the lateral edge of the wall 6.

It will be immediately apparent that by directly cooling the surface (counter surface) of the workpiece directly in line with the contact zone for the tool against the workpiece, the heat transfer from the machined area is considerable and the overheating is eliminated as a problem.

Figure 2:
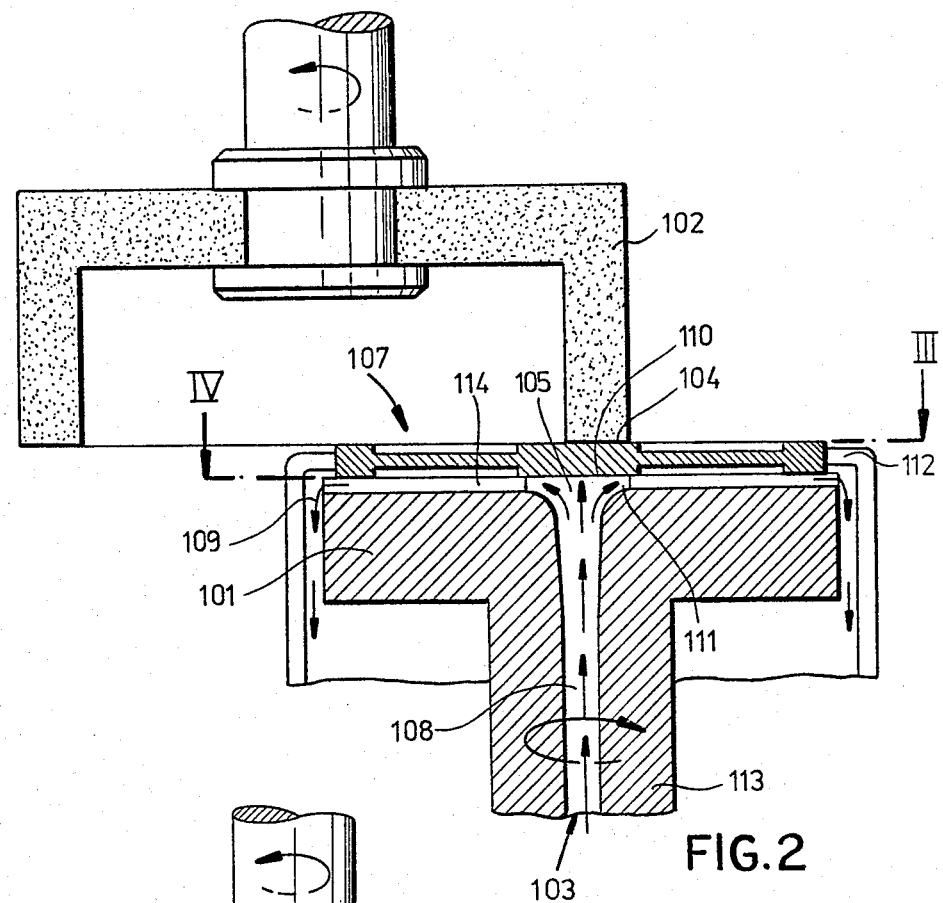
FIG. 2 is a view similar to FIG. 1 showing a device for the superfinishing of a disk-shaped metal workpiece.
Figure 3:
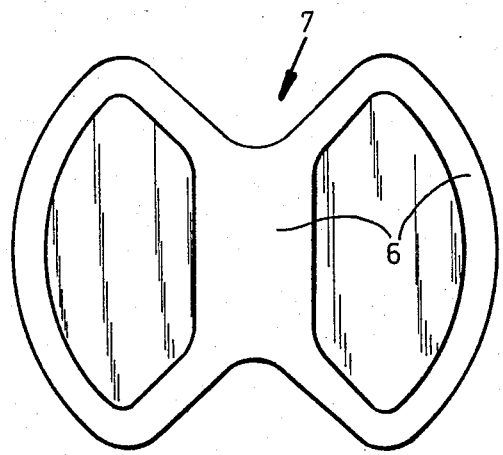
FIG. 3 is a section taken generally along the plane represented by the arrow II.
Figure 4:
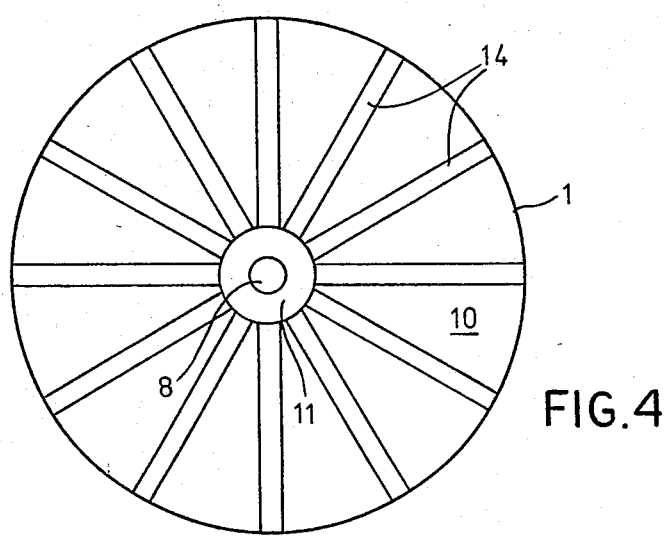
FIG. 4 is a section taken generally in the plane represented by the arrow IV.

The embodiment of FIGS. 2–4 represents a variation for the honing or superfinishing of disk-shaped workpieces 107, e.g. butterfly valves. The workpiece 7 can be received on a holder 101 formed as a disk which is surrounded by stationary centering fingers 12 and is carried by a drive shaft 13 which enables rotation of the holder.

The opposite surface 110 of the workpiece 107, juxtaposed with the contact surface 4 of the tool, can confront radially extending coolant channels 14 which carry the coolant radially outwardly and out of contact with the workpiece.

The cooling channels 114 communicate with the diffuser end 111 of a passage 108 formed in the shaft 113.

The radial outflow of the coolant is represented at 109 in FIG. 2. Note that the fluid applied to the back of the workpiece supports the latter against the grinding or honing force in the axial direction and because of the radial outflow of liquid, the Coanda effect or the Bernoulli effect can be utilized to draw the workpiece against the holder with suction when the velocity of the liquid reduces the pressure beneath the workpiece to a level below atmospheric pressure.

We claim:

1. A method of superfinishing a thin-wall workpiece which comprises the steps of:
   juxtaposing a surface of said workpiece to be superfinished with a superfinishing tool with said surface being pressed against said tool in a zone of said surface;
   rotating said tool about an axis thereof to super-finish said surface of said workpiece;
   directing a stream of a coolant fluid against the counter surface of said workpiece in said zone directly opposite said surface of said workpiece, said coolant being directed against said counter surface of said workpiece generally perpendicularly thereto and the coolant fluid being deflected radially along said counter surface of said workpiece; and
   retaining said workpiece in a holder, rotating said holder about an axis of symmetry of said workpiece, and feeding said fluid along the axis of symmetry of said workpiece into contact with said counter surface.

2. The method defined in claim 1, further comprising the step of spreading the fluid prior to contact with said counter surface with a diffuser diverging toward said counter surface.

3. The method defined in claim 1 wherein said fluid is directed against said counter surface at a velocity such that suction is generated to hold said workpiece in a holder along said counter surface.

4. The method defined in claim 1 wherein said fluid is a liquid coolant.

5. The method defined in claim 1 wherein said fluid is a gaseous coolant.

6. An apparatus for superfinishing an axial-symmetrical thin-wall workpiece comprising:
   a superfinishing grinding tool;
   means for rotating said tool about an axis thereof;
   a holder juxtaposed with said tool;
   means for rotating said holder about an axis thereof, said holder receiving said workpiece and positioning said workpiece with a surface to be machined in contact with said tool and a counter surface which is left free over at least a portion thereof directly opposite said tool; and
   means for directing a stream of a coolant against said counter surface for cooling said workpiece, said coolant passing outwardly over said workpiece for collection, said workpiece being hollow and opening away from said tool, said holder having a cylindrical configuration and being opened toward said tool to receive said workpiece, said holder and said tool defining a space flooded with said fluid and separated by said surface from said tool, said fluid being introduced into said space by a tube directed against said counter surface, said holder being provided with a fixed formation engaging a lateral edge of said workpiece for laterally retaining same on said holder, said holder comprising a plate provided with radially outwardly extending channels turned toward said counter surface for conducting fluid away from said counter surface, said plate being formed with a central passage for said fluid directing same against said counter surface.

7. The apparatus defined in claim 6 wherein said passage has a diffuser like terminal portion of progressively increasing cross section turned toward said counter surface.

* * * * *